United States Patent
Masalha et al.

(10) Patent No.: US 12,289,393 B2
(45) Date of Patent: Apr. 29, 2025

(54) TOURNAMENT TYPE SELECTION OPERATIONS ON ENCRYPTED DATA

(71) Applicant: International Business Machines Corporation, Armonk, NY (US)

(72) Inventors: Ramy Masalha, Kafr Qari (IL); Ehud Aharoni, Kfar Saba (IL); Nir Drucker, Zichron Yaakov (IL); Gilad Ezov, Nesher (IL); Hayim Shaul, Kfar Saba (IL); Omri Soceanu, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 17/992,597

(22) Filed: Nov. 22, 2022

(65) Prior Publication Data

US 2024/0171375 A1    May 23, 2024

(51) Int. Cl.
*H04L 9/06* (2006.01)
*H04L 9/00* (2022.01)

(52) U.S. Cl.
CPC ............ *H04L 9/0618* (2013.01); *H04L 9/008* (2013.01)

(58) Field of Classification Search
CPC .............................. H04L 9/0618; H04L 9/008
See application file for complete search history.

(56) References Cited

U.S. PATENT DOCUMENTS

| | | | |
|---|---|---|---|
| 8,862,627 B2 * | 10/2014 | Ferringer | G06N 3/126 706/13 |
| 2013/0117070 A1 * | 5/2013 | Sun | G06Q 30/08 705/7.31 |
| 2015/0199010 A1 * | 7/2015 | Coleman | H04L 67/01 345/156 |

(Continued)

FOREIGN PATENT DOCUMENTS

CN    110633494 A   * 12/2019

OTHER PUBLICATIONS

Iliashenko, Ilia et al., "Faster homomorphic comparison operations for BGV and BFV", https://eprint.iacr.org/2021/315.pdf, Jul. 12, 2021, 33 pages. (Year: 2021).*

(Continued)

*Primary Examiner* — Richard G Keehn
(74) *Attorney, Agent, or Firm* — CANTOR COLBURN LLP; Anthony Mauricio Pallone

(57) ABSTRACT

Mechanisms are provided for performing a tournament selection process of a computer function. A request is received to execute the computer function on an input vector data structure, where a result of the computer function is provided by executing the tournament selection process. The input vector data structure is received, comprising a plurality of values where each value corresponds to a vector slot. An index vector data structure is received that comprises indices of the vector slots of the input vector. Iteration(s) of the tournament selection process are executed to identify a value in the input vector satisfying a criterion of the computer (Continued)

function. An operation is performed on the index vector data structure to generate an indicator vector data structure that uniquely identifies a slot in the input vector data structure that is a result of the computer function being executed on the input vector data structure.

18 Claims, 8 Drawing Sheets

(56) References Cited

U.S. PATENT DOCUMENTS

2019/0113973 A1* 4/2019 Coleman .................. G06F 3/011
2021/0119766 A1* 4/2021 Suresh .................... H04L 9/008

OTHER PUBLICATIONS

"Argmin with SIMD", https://en.algorithmica.org/hpc/algorithms/argmin/, last accessed on (Mar. 5, 2022), 10 pages.
Branke, Jurgen et al., "Global Selection Methods for SIMD Computers", http://citeseerx.ist.psu.edu/viewdoc/summary?doi=10.1.1.43.5400, Published Nov. 1998, 12 pages.
Iliashenko, Ilia et al., "Faster homomorphic comparison operations for BGV and BFV", https://eprint.iacr.org/2021/315.pdf, Jul. 12, 2021, 33 pages.
Lee, Junghyun et al., "Precise Approximation of Convolutional Neural Networks for Homomorphically Encrypted Data", arXiv:2105.10879v4 [cs.CR] Jun. 14, 2021, 24 pages.
Smart, N.P. et al., "Fully Homomorphic SIMD Operations", https://eprint.iacr.org/2011/133.pdf, Jul. 4, 2012, 19 pages.
Waszkiewicz, Daniel et al., "Confidential Greedy Graph Algorithm", Intl Journal of Electronics and Telecommunications, 2018, vol. 64, No. 2, Jan. 24, 2018, 5 pages.
Zhao, Bowen et al., "Evolution as a Service: A Privacy-Preserving Genetic Algorithm for Combinatorial Optimization", arXiv:2205.13948v1 [cs.NE], May 27, 2022, 13 pages.
Zuber, Martin et al., "Efficient and Accurate homomorphic comparisons", https://eprint.iacr.org/2022/622.pdf, May 20, 2022, 24 pages.
Zuber, Martin, "Towards real-time hidden speaker recognition by means of fully homomorphic encryption", https://eprint.iacr.org/2019/976.pdf, Nov. 2020, 23 pages.

* cited by examiner

TOURNAMENT TYPE SELECTION OPERATIONS ON ENCRYPTED DATA

BACKGROUND

The present application relates generally to an improved data processing apparatus and method and more specifically to an improved computing tool and improved computing tool operations/functionality for performing tournament type selection operations on encrypted data.

Fully homomorphic encryption (FHE) is an encryption scheme that enables analytical functions to be run directly on encrypted data, also referred to as ciphertext, while yielding results from the encrypted data that are the same as if the analytical functions were executed on the unencrypted data, also referred to as the plaintext. Such encryption schemes are attractive in cloud-based computing environments as it allows data providers to encrypt their data, and thereby maintain the privacy or secrecy of the data, before providing the encrypted data to cloud services that execute analytical functions on the encrypted data, train machine learning computer models using the encrypted data as training and testing datasets, execute machine learning computer models on the encrypted data, or the like, generate results that are returned to the data providers. This allows data providers to leverage the computational capabilities and services of cloud-based computing environments without exposing their private data to other parties.

For example, a data provider, e.g., a hospital, medical insurance company, financial institution, government agency, or the like, may maintain a database of data comprising private data about patients that the data provider does not want exposed outside of its own computing environment. However, the data provider, for various reasons, wishes to utilize the analytical capabilities, machine learning computer models, or the like, of one or more cloud-based computing systems to perform analytical functions, artificial intelligence operations, such as generating insights from classifications/predictions performed by trained machine learning computer models, or the like, on the private data. For example, if the data provider is a hospital and wishes to perform analytics on its patient data, the hospital would like to send the patient data to the cloud-based computing systems for performance of these analytics, which may use specially trained machine learning algorithms and the like. However, the hospital does not want to expose the personally identifiable information (PII) of the patients, e.g., names, addresses, social security numbers, or other types of information that alone or in combination can uniquely identify an individual, as such exposure would not only open the hospital to legal liability, but may also be in violation of established laws of the jurisdiction(s) in which the hospital operates. As a result, using FHE, the hospital may encrypt the data prior to sending the encrypted data to the cloud-based computing system for performance of the analytics functions. The analytics are executed on the encrypted data and the encrypted results are returned. The data provider then unencrypts the encrypted results and obtains the unencrypted results for use by the hospital. At no time in this process does the cloud-based computing system gain access to the unencrypted data and thus, privacy is preserved.

Thus, FHE allows analytical functions to be performed on private data without divulging the private data itself, and without the need for trusted third parties or intermediaries, and without having to mask or drop features in order to preserve privacy of the data, e.g., through replacement of PII with generic privacy preserving representations of the PII, or other modifications or replacements of private data. However, performance of certain analytical functions on such ciphertexts in FHE require the implementation of tournament type selection operations which, with current FHE mechanisms, can only be performed between ciphertexts rather than between the slots of a single ciphertext. This is because of the resource costs involved in performing the many rotations of the ciphertext that would be needed to perform the tournament type selection operation, as well as the fact that such rotations may introduce errors into the ciphertexts.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for performing a tournament selection process of a computer function. The method comprises receiving a request to execute the computer function on an input vector data structure, wherein a result of the computer function is provided by executing the tournament selection process. The method also comprises receiving the input vector data structure comprising a plurality of values, each value corresponding to a vector slot of the input vector, and receiving an index vector data structure comprising indices of the vector slots of the input vector. The method further comprises executing at least one iteration of the tournament selection process to identify a value in the input vector satisfying a criterion of the computer function. Moreover, the method comprises performing an operation on the index vector data structure to generate an indicator vector data structure that uniquely identifies a slot in the input vector data structure that is a result of the computer function being executed on the input vector data structure.

In some illustrative embodiments, the input vector data structure is a single ciphertext data structure, and executing the at least one iteration of the tournament selection process comprises performing local selection operations between pairs of slots within the single ciphertext data structure based on the requested computer function. Thus, the illustrative embodiments support performing tournament type selection computer functions within a single ciphertext data structure rather than between multiple different ciphertext data structures.

In some illustrative embodiments, the computer function is one of a max function, an argmax function, a min function, an argmin function, or a candidate selection operation in which criteria for selection is specified in the computer function. These functions are those that are used in many machine learning, genetic, and other types of algorithms, and thus, the performance of not only the tournament selection process is improved, but also these functions and algorithms.

In some illustrative embodiments, executing at least one iteration of the tournament selection process comprises: (1) executing a first iteration in which the input vector data structure is processed at least by executing a first rotation operation on the input vector data structure to generate a first rotated vector, and executing the computer function on the input vector data structure and the first rotated vector to generate a first intermediate vector result data structure; (2) broadcasting values of the first intermediate vector result data structure to adjacent slots within in the intermediate vector data structure to generate a first broadcast intermediate vector result data structure; (3) executing a first masking operation on a first indicator vector data structure to generate a first intermediate indicator vector data structure; and (4) updating the first indicator vector data structure based on a combination of the first indicator vector data structure and the first intermediate indicator vector data structure, to thereby generate a second indicator vector data structure. In some illustrative embodiments, executing at least on iteration of the tournament selection process further comprises: (5) executing a second iteration in which the first broadcast intermediate vector result data structure is processed at least by executing a second rotation operation on the first broadcast intermediate vector result data structure to generate a second rotated vector, and executing the computer function on the first broadcast intermediate vector result data structure and the second rotated vector to generate a second intermediate vector result data structure; (6) executing a second masking operation on the second indicator vector data structure to generate a second intermediate indicator vector data structure; and (7) updating the second indicator vector data structure based on a combination of the second indicator vector data structure and the second intermediate indicator vector data structure, to thereby generate a third indicator vector data structure. Thus, with this process, costly isEqual functionality may be avoided while generating an indicator vector that uniquely identifies the winner of the tournament selection process with less resource utilization and less potential sources of noise than embodiments in which the isEqual function is utilized.

In some illustrative embodiments, the first rotation operation has a first rotation value for rotating slots of the input vector data structure, wherein the second rotation operation has a second rotation value for rotating slots of the first broadcast intermediate vector result data structure, and wherein the first rotation value and second rotation value are different. In some illustrative embodiments, the first rotation value and second rotation value are calculated as 2 to the power of the iteration.

In some illustrative embodiments, executing at least one iteration of the tournament selection process to identify a value in the input vector satisfying a criterion of the computer function comprises executing a folding operation on the input vector data structure and updating the index vector data structure to generate an updated index vector data structure having an index value for a winner of the tournament selection process in each slot of the updated index vector data structure. In this way, the input vector data structure is updated to have the winner of the tournament selection process represented in each of the slots of the resulting vector data structure, and the index vector data structure is updated to have the index of the winner in all slots.

In some illustrative embodiments, performing an operation on the index vector data structure to generate an indicator vector data structure comprises executing an isEqual operation on the index vector data structure and the updated index vector data structure to generate the indicator vector data structure in which the indicator vector data structure has a first value in only a slot of the indicator vector data structure corresponding to the winner of the tournament selection process and all other slots of the indicator vector data structure have a second value.

In some illustrative embodiments, the computer function implements a computer function in a homomorphic encrypted operation. In this way, homomorphic encrypted operations, which are resource intensive and often utilize tournament type selection processes, may be made more efficient though the more efficient tournament selection process mechanisms of the illustrative embodiments.

In other optional illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another optional illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As mentioned above, fully homomorphic encryption (FHE) is a promising solution to enable privacy preserving machine learning in cloud computing environments. Many machine learning applications involve the execution of a tournament type process to select an element from a set of elements. For example, applications of a tournament type process for performing a computer operation include the argmax or argmin functions of an ordered set, where these functions select the maximum or minimum values from the ordered set, respectively. Another example operation may be the probabilistic selection of a fittest candidate from among a set of candidates, such as may be performed in genetic algorithms and the like.

FHE algorithms pack multiple values, or candidates, into a single ciphertext, where each value/candidate is represented as a slot in the ciphertext vector. This allows for single instruction multiple data (SIMD) operations to be performed on the ciphertext slots. Utilizing SIMD operations helps to reduce the number of operations and the number of ciphertexts, which in turn reduces the latency and memory consumption of programs implementing such FHE algorithms. In particular it is useful to utilize SIMD operations to implement tournament type selection operations.

Figure 1:
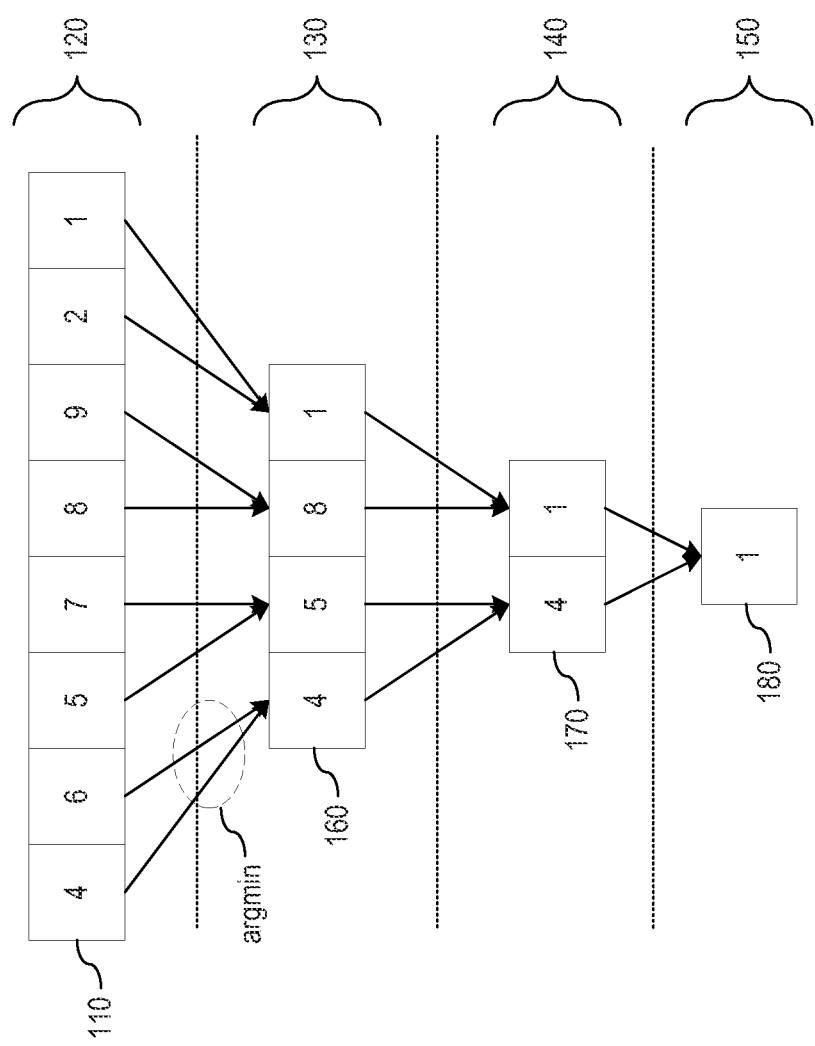
FIG. 1 is an example diagram illustrating a tournament type selection operation where local selection is performed over multiple iterations or rounds in order to ultimately generate a global selection.

FIG. 1 is an example diagram illustrating a tournament type selection operation, such as those that may be used in functions such as argmin, argmax, or any other suitable function where local selection is performed over multiple iterations or rounds in order to ultimately generate a global selection. In the example shown in FIG. 1, an argmin operation is depicted, however it should be appreciated that this is only an example and other similar tournament type selection operations may be performed with other functions or operations, such as argmax, prediction operations (often used in machine learning operations) such as maxpooling, K-nearest neighbor, operations for selecting optimum candidates from a set of candidates, e.g., maximum accuracy/lowest error in machine learning training operations, or the like. As one specific implementation, such tournament type selection processes may be implemented in genetic algorithms that select between a plurality of candidates represented as slots in a ciphertext to determine a fittest candidate.

The tournament type selection process shown in FIG. 1 is an example performed with regard to an input ciphertext 110, where the tournament type selection process is specifically part of an argmin operation based analytic that finds the minimum ciphertext value or slot within the given input ciphertext 110. Each level 120-150 represents the results of an iteration or round of the tournament type selection operation in which local selections are performed, and with the combination of levels 120-150 together representing the overall function, e.g., argmin, or tournament type selection process, level 150 providing the final global result of the function or selection process.

As shown in FIG. 1 the input ciphertext 110 has a plurality of slots, which for ease of explanation have the depicted values, however it should be appreciated that these ciphertext slots may have more complex values of various formats depending on the particular implementation. In the depicted example, which is simplified for ease of explanation but may have many more slots and more complex values than those shown, the input ciphertext 110 has values [4, 6, 5, 7, 8, 9, 2, 1]. In a first round or iteration of the argmin operation, the minimum between each sequential pairing of slots is determined to generate a first intermediate result 160. That is the first two slots compare the values of 4 and 6 with the minimum value being selected for inclusion in the first intermediate result 160, e.g., 4 in this case. The same process is performed for the third and fourth slots, the fifth and sixth slots, and the seventh and eighth slots, e.g., local argmin operations of argmin[5, 7], argmin[8,9], and argmin[2,1], to generate intermediate result 160 comprising values [4,5,8,1].

In a next round or iteration, the intermediate result 160 is operated on to again determine the local argmin between the first two slots and the last two slots, e.g., argmin[4, 5] and argmin[8, 1], to generate the second intermediate result 170 having values [4, 1]. This process is then performed again with a next round or iteration that generates the final result 180 of [1]. Thus, the value [1] is the minimum value in the original input ciphertext 110. This process is referred to as a tournament type process as the process mirrors a sports tournament in which teams are paired against each other and the "winners" go on to play one of the "winners" from a previous round of the tournament.

FHE algorithms that utilize such tournament type processes between ciphertexts rather than within the same ciphertext. That is, while FIG. 1 shows a tournament type process being performed between slots of a single ciphertext, as that is a process that the illustrative embodiments facilitate, FHE algorithms operate to perform tournament type selections between two different ciphertexts, e.g., a first ciphertext [4, 6, 5, 7] and a second ciphertext [6, 5, 7, 4] with a result of an argmin operation being [4, 5, 5, 4] in this case. Performing a tournament type process within a single ciphertext is a non-trivial operation because it requires costly rotation operations being performed on the ciphertext slots to accomplish what is shown in FIG. 1. Each rotation is time consuming and may add errors to the ciphertext values.

The illustrative embodiments provide an improved computing tool and improved computing tool operations/functionality to provide tournament type selection processes that utilized indicator vectors and a minimized number of rotations to accomplish the tournament type selection process. The illustrative embodiments provide a tradeoff between the number of rotation operations needed and the multiplication depth of the tournament selection process. Because the illustrative embodiments are more efficient with regard to the minimized number of rotations and multiplication depth, the tournament type selection process and improved computing tool functionality provided by the illustrative embodiments facilitates intra-ciphertext tournament type selection process based functions to be performed between slots of the same ciphertext. This in turn improves operations that rely on such ciphertexts including fully homomorphic encryption (FHE) based algorithms, which may include machine learning operations, genetic algorithms, and the like.

It should be appreciated that while the illustrative embodiments are described herein with regard to ciphertexts and the use of ciphertexts with fully homomorphic encryption (FHE), the illustrative embodiments are not limited to such. Rather, the illustrative embodiments may be implemented with regard to any computer operations in which multiple rounds or iterations of local selections are performed in order to ultimately generate a global selection, i.e., a tournament type selection process, whether the data is a ciphertext or plaintext. For example, the illustrative embodiments may operate to improve such tournament type selection processes with regard to any vector inputs where the selection is between slots of one or more vectors. Thus, while the illustrative embodiments will be described with regard to slots of an input ciphertext, the illustrative embodiments are not limited to such and other vectors, or sets of data values, may be used without departing from the spirit and scope of the present invention.

With this in mind, with regard to the illustrative embodiments operating on a ciphertext input, it is assumed that an input ciphertext, represented as a vector of values where each value is an encrypted value, is received and is the basis for the tournament type selection process. That is, the processor of a computing device receives, from memory, data storage, or the like, a data structure that is the input ciphertext for performance of an operation on that ciphertext as part of an overall computer algorithm, such as a machine learning algorithm, genetic analysis algorithm, or the like. The computer operation may be, for example, an argmax, argmin, max, min, or other computer function/operation that relies on a tournament type selection process to perform the function/operation. For purposes of the present description, the input ciphertext data structure is referred to as C and encrypts a vector of n values, i.e., $V=\{v_1, \ldots v_n\}$ such that $C=Enc(V)$, and $v_i$ are the values from which a tournament "winner" is selected during each local selection operation and ultimately resulting in a global "winner".

In addition to the input ciphertext data structure, the illustrative embodiments utilize an indicator vector F, where values of the indicator vector F are binary and set to a first value if a corresponding slot in C is a "winner" of a round of the tournament type selection process, and is set to a second value if the corresponding slot in C is not the "winner" of the round, e.g., 1 if it is the winner or 0 if it is not, where the "winner" is the slot whose value meets the criteria of the function being performed, e.g., the highest value for a max function, lowest value for a min function, etc. The tournament type selection process involves log(n) iterations or rounds, where each iteration/round selects half or the remaining values from the ciphertext/intermediate results. Different methods of performing this tournament type selection process are provided by the illustrative embodiments.

In each method, a folding operation is used to compute the "winner" of the tournament for that round/iteration and its index value, e.g., slot identifier. A folding operation rotates a ciphertext C by an index i and then performs a specific function (e.g., minimum) between each slot of C and the corresponding slot of the rotated ciphertext.

In a first method of the tournament type selection process of the illustrative embodiments, the folding operation selects a "winner" of the tournament, similar to shown in FIG. 1 above, for that iteration/round, and an "isEqual" function is used on the index of the winner and the indices of the slots of the input ciphertext to generate a one-hot indicator vector. Thus, the indicator vector specifies the slot in the ciphertext where the winner of the tournament type selection process is located. The "isEqual" function requires a plurality of comparisons, e.g., multiplication operations, to compare the "winner" index with the indexes of vector slots in the original input ciphertext so as to identify which ciphertext slot corresponds to the winner of the tournament type selection process. The resulting indicator vector uniquely identifies the winner of the overall tournament type selection process of the given function, e.g., argmax, max, argmin, min, etc., in the original input ciphertext vector. Thus, with the indicator vector and the ciphertext, computing operations that rely on or otherwise invoke the given function, e.g., argmax, max, argmin, min, or the like, may utilize the correct slot of the ciphertext to perform their functions.

The indicator vector may be used to perform other operations that are dependent on the tournament winner. For example, if the tournament selection is performed to choose the maximal f1 score among several f1 scores of several machine learning models, then the resulting indicator vector may be used to extract the model that has the maximal f1 score and use this model for further computations.

In a second method, recognizing that the "isEqual" function can be a costly operation in terms of multiplication depth, runtime, and noise mechanisms are provided for avoiding the use of the "isEqual" function by populating the indicator vectors throughout the tournament type selection process, i.e., updating the indicator vector at each iteration/round of the tournament type selection process. The method applies an iteration/round of the tournament type selection process and then broadcasts the results from every 2i slot to its adjacent slot and updates the indicator vector using the intermediate indicators. The broadcasting operation ensures that the intermediate values are properly packed and are suitable for further processing in the following iterations/rounds of the tournament type selection process.

By implementing this alternative embodiment to avoid use of the "isEqual" function, a performance improvement is achieved due to the various costs of the "isEqual" function being saved. That is, the isEqual function is costly in terms of multiplication depth as the isEqual function is computed by an approximation that involves a large number of multiplications. This is significant because FHE operations are often limited with the maximal multiplication depth they support. If the multiplication depth is too deep, then one may have to use an operation called "bootstrapping" to enable further calculations. This bootstrapping operation usually takes a large amount of time and adds errors to the ciphertext values.

The "isEqual" function is further costly in terms of runtime and noise. That is, the "isEqual" function for FHE operations requires a large amount of time to make the computations and adds errors to the ciphertext values for two main reasons. First, because the isEqual function is many times approximated instead of precisely calculated, the result contains an inherent error. Second, in many FHE schemes, each operation adds an error to the used ciphertext. As isEqual implementation involves a large number of operations (e.g. multiplications) on the input ciphertext, which therefore results in the potential for a large number of errors being introduced and hence, a noisy output.

Thus, the illustrative embodiments provide an improved computing tool and improved computing tool functionality that is specifically directed to solving technological issues with regard to performing computer tournament type selection processes, such as are used in machine learning, genetic algorithms, and a plethora of other computer operations that perform local selections over a number of iterations in order to generate a final global selection. The illustrative embodiments minimize the number of computer rotation operations needed to be performed on vectors, such as ciphertexts, and reduces costs with regard to computation time, multiplication depth, and introduction of noise into the solution. Thus, tournament type selection processes in computer operations are made more efficient.

Of particular note, the illustrative embodiments are especially well suited to operations involving ciphertexts, such as in the case of fully homomorphic encryption (FHE) enabled operations, e.g., machine learning, knowledge graph embedding, or a variety of other operations where privacy of the features in the data is to be maintained, e.g., labels and other features, of the entities and predicates (relationships or links) in the graph embeddings, features used for performing machine learning, and the like. The tournament type selection process facilitates more complex computer operations, such as expanding the knowledge graph, evaluating queries based on the knowledge graph, such as predicting a likelihood that two entities have a relation specified in the query, or the like. These operations may also include operations such as performing machine learning model based classification, prediction, or the like, training such machine learning models, and the like. In general, any homomorphic encryption (HE) functionality based analytics, such as HE layers of a machine learning computer model, that involve the execution of tournament type selection processes will be improved by the improved computing tool functionalities of the illustrative embodiments.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As noted above, the illustrative embodiments provide an improvement to the specific way in which computers perform tournament type selection processes as part of computer operations such as argmax, max, argmin, min, and other computer processes that involve a tournament type selection. The improvement may be implemented as a dedicated hardware component of a processor, a set of software instructions loaded into memory and executed by the processor, or any combination of dedicated hardware and/or instructions loaded into memory and executed by the processor. The illustrative embodiments provide specific improved computer functionality that improves such tournament type selection processes by implementing a tournament type selection operation with broadcasting and indicator vector update each round of the tournament type selection operation.

The tournament selection improvements are composed of log(n) iterations, each computing one level of the tournament selection. In a first improved tournament selection method, a folding algorithm is used to compute the tournament "winner" as well as its index (slot number in the input ciphertext), and then uses an "isEqual( )" operation to obtain an indicator vector encrypting "1" in the slot of the indicator vector corresponding to the winning value and "0" in all other slots of the indicator vector.

In a second improved tournament selection method, the need for using the costly "isEqual( )" operation is removed by populating the required indicator vector throughout the tournament process. In the $i^{th}$ iteration of this second improved tournament selection method, the tournament results are broadcast from each tuple of $2^i$ slots to its adjacent tuple. This broadcasting ensures that intermediate values are properly packed and are suitable for further processing in the following iterations, thus reducing the number of required rotations.

As reducing the multiplication depth of the result is also desired in FHE computations, options may be provided to reduce the multiplication depth. For example, in a first option, some of the multiplications are combined together so that the multiplication depth is reduced. In a second option, there is a tradeoff of multiplication depth with number of rotations. In a third option, multiplication depth is decreased by log(n) at the account of consuming O(n) rotations, as opposed to the O(log(n)) rotations required by the other methods discussed above. Compared to previously used methods to perform a tournament type selection process on encrypted data, i.e., ciphertexts, the illustrative embodiments reduce latency and memory consumption, at least because these illustrative embodiments operate on a single ciphertext rather than requiring several ciphertexts, which are crucial in FHE computations because FHE applications consume large amounts of time and memory and may not be practical without proper runtime and memory improvements.

Figure 2:
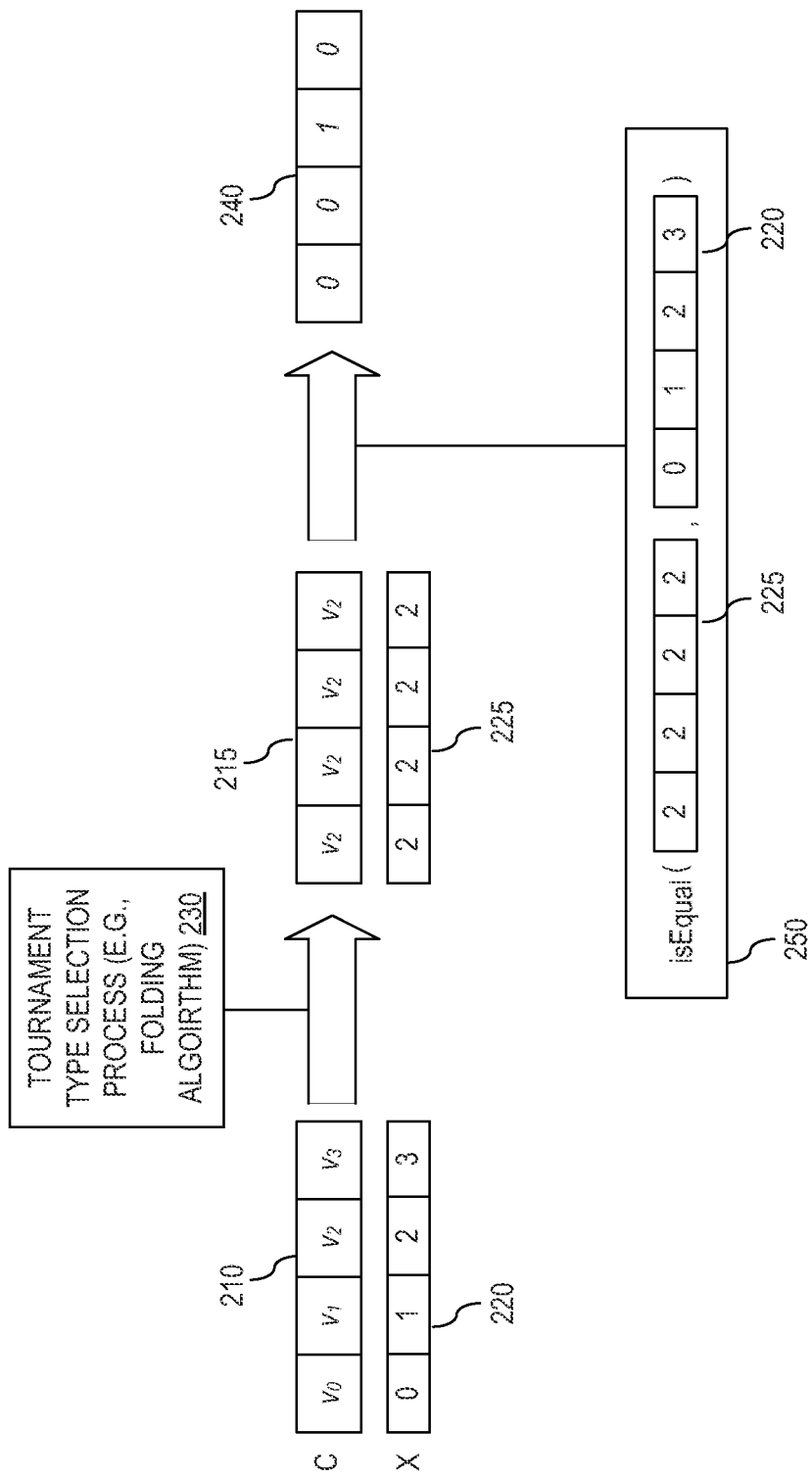
FIG. 2 is an example diagram of a first improvement to tournament type selection operations in which an isEqual( ) function is utilized, in accordance with one illustrative embodiment.

FIG. 2 is an example diagram of a first improvement to tournament type selection operations in accordance with one illustrative embodiment. With the improvement in FIG. 2, it is assumed that a function f( ) is a function that can be computed using a tournament type selection process, e.g., f( )=argmax( ). Again, V={$v_1, v_2, \ldots, v_n$} is a set of values that the tournament selection process is to be performed on, where n may be any suitable value, but for purposes of illustration is chosen to be a power of 2. C is a ciphertext which encrypts the set V and C[i] is the $i^{th}$ slot of C.

The illustrative embodiments utilize a rotation operation, rot(C, i) which receives the ciphertext C and an integer i, and rotates the slots of C by i indexes to the left. If i<0, then rot(C, i) rotates the slots of C by −i indexes to the right. The illustrative embodiments also utilize a function f(C1, C2) which receives two ciphertexts, C1 and C2, and returns two new output ciphertexts C3 and I. The first output ciphertext, C3, corresponds to the result of a tournament between C1 and C2. That is, C3[i]=C1[i] if C1[i] won over C2[i], and C3[i]=C2[i] otherwise. The second output ciphertext, I, is an indicator vector whose $i^{th}$ slot is equal to 1 if C1[i] was chosen by f( ) and 0 otherwise.

The "isEqual( )" function is also utilized in some illustrative embodiments. The isEqual(C1, C2) function returns an output ciphertext C3 whose $i^{th}$ slot is equal to 1 if C1[i]=C2[i] and 0 otherwise. A mask function, i.e., mask(C, i) may also be utilized which, for each even integer k such that $k*2^i<n$, and for each j such that $2^i<=j<2^{i+1}$, this function sets $C[k*2^i+j]$ to 0. That is, this function zeros the right half of each $2^{i+1}$ consecutive slots of C, where a sequence of consecutive slots is also referred to as a "block". It should be noted that mask(C, i) can be implemented by one ciphertext-plaintext multiplication. For example, mask(C, i) may be implemented by multiplying C by a plaintext vector, V, such that $V[k*2^i+j]=0$ for each k, such that $k*2^i<n$, and for each j such that $2^i<=j<=2^{i+1}$, and all other elements of V, are 0.

With these functions, as shown in FIG. 2, an input ciphertext 210 is received by the tournament selection tool of the illustrative embodiments, where this ciphertext encrypts the vector V comprising encrypted values $v_0, v_1, v_2$, and $v_3$ in this simplified example. While the vector and ciphertext 210 are shown as only have 4 encrypted values for simplifying the present explanation, it should be appreciated that in actual practice, these vectors may comprise a large number of values and vector slots, e.g., 64, 128, 256, or even higher numbers of values and vector slots, generally referred to as n values/slots. Each of the vector slots in the ciphertext has a corresponding index value, e.g., 0, 1, 2, and 3 in the example, which is encrypted in the input ciphertext X 220, i.e., X encrypts i in its $i^{th}$ slot.

A tournament algorithm 230 is applied to the ciphertext 210 and index ciphertext X 220, which determines a winner of the tournament selection process. In some illustrative embodiments, this tournament algorithm 230 may make use of a known folding algorithm. For example, the folding algorithm may take as an input C=Enc($v_1, \ldots, v_n$) and a function f, and outputs a ciphertext, C, that contains f($v_1, \ldots, v_n$) in all of its slots, e.g., for i=0 . . . log(n)−1: C=f(C, rot(C, $2^i$)).

The tournament algorithm 230 performs log(n) iterations to find the winner of the tournament selection process, which in this case is the value $v_2$, as shown in output ciphertext vector 215 where $v_2$ is present in each of the slots of the output ciphertext vector 215 and the index of v2 populates each of the slots of the updated index ciphertext X 225. Thus, at the end of the tournament algorithm 230, the output ciphertext, i.e., updated C, 215 will contain the "winning" value of the tournament in all of its slots, e.g., $v_2$ in this example, and the updated index ciphertext X 225 will contain the index of the winning value in all of its slots, e.g., 2 in this example.

Another output ciphertext, F, 240, referred to as an indicator ciphertext F 240, contains a "1" in the slot corresponding to the wining value and 0 in all other slots. The indicator ciphertext F 240, in the depicted illustrative embodiment, is generated by executing the is Equal( ) function 250 on the original input index ciphertext X 220 and the updated index ciphertext X 225. As noted above, the isEqual(X, Updated X) will compare the values in each slot and output a "1" for slots that are equal and a "0" for all other slots. Thus, in the depicted example, the isEqual( ) function 250 outputs the indicator ciphertext F 240 having values [0, 0, 1, 0] because the winner of the tournament is present in slot 2 of the input ciphertext 210.

Thus, in this first improved tournament process, the process for generating the output ciphertexts may include the following set of operations:

1. $X0 = X //A$ ciphertext encrypting $i$ in its $i$-th slot 2. for $i = 0 \ldots \log(n) - 1$:

3. $C, I = f(C, \text{rot}(C, 2^i))$

4. $X = X * I + 1(1 - I) * \text{rot}(X, 2^i)$

5. $F = \text{isEqual}(X, X0)$

The multiplication depth of the above set of operations is given by $(\log(n)) * (\text{depth\_of\_f} + 1) + \text{depth\_of\_isEqual}$, and it requires $2 * \log(n)$ rotations. The isEqual( ) operation in Line 5 is usually costly in terms of runtime, multiplication depth, and noise. To remove the need for using isEqual( ) operation, an additional improvement to may be provided to homomorphically implement a tournament-like selection process and populate the corresponding indicators ciphertext F at each iteration or round of the tournament like selection process rather than waiting until after the tournament selection process is completed. In this alternative illustrative embodiment, the input ciphertext C 210 is again received and the indicator ciphertext F 240 is encrypted with a first value, e.g., "1", in all of its slots. At the end of the alternative illustrative embodiment operation, the ciphertext C 210 contains the selected value, i.e., the winner of the tournament, in all of its slots, while the indicator ciphertext F 240 will contain the first value, e.g., "1", in its i slot if $v_i$ was selected, and 0 otherwise.

Figure 3A:
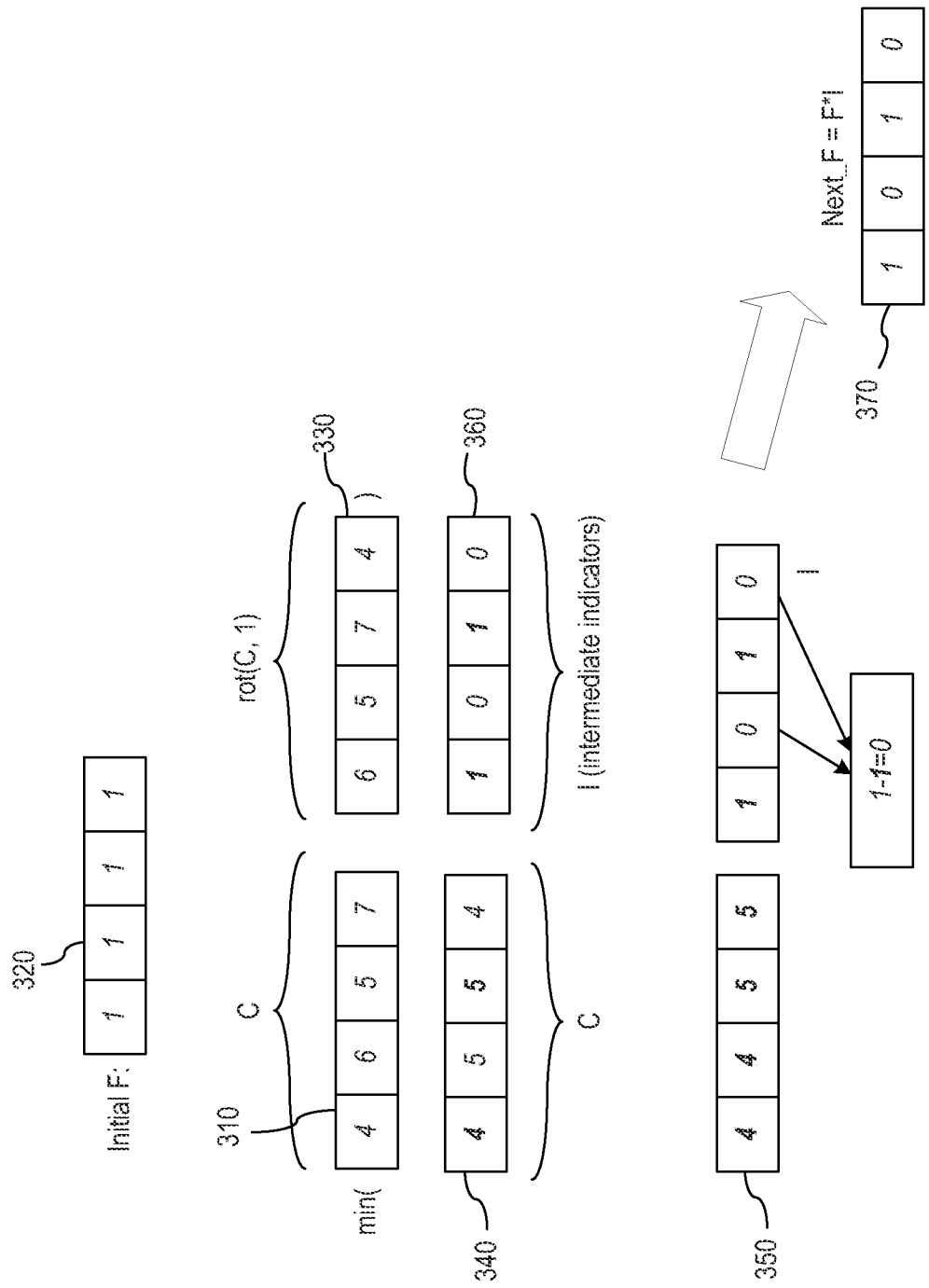
FIGS. 3A-3B are example diagrams illustrating a second improvement to tournament type selection operations in accordance with one illustrative embodiment, specifically where the isEqual( ) function of FIG. 2 has been eliminated to reduce the performance costs of the overall tournament selection process.
Figure 3B:
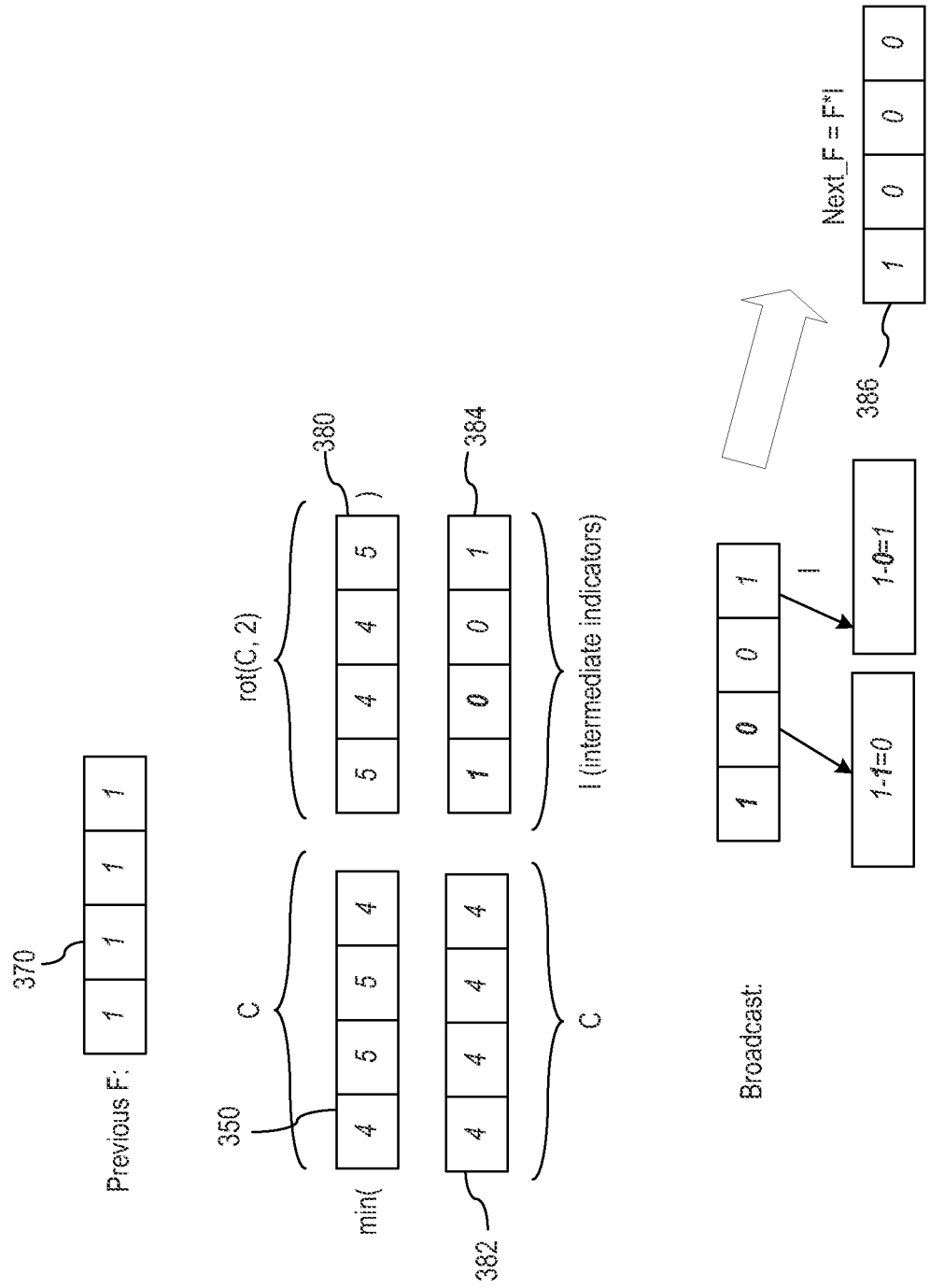

FIGS. 3A-3B are example diagrams illustrating a second improvement to tournament type selection operations in accordance with one illustrative embodiment, specifically where the isEqual( ) function of FIG. 2 has been eliminated to reduce the performance costs of the overall tournament selection process. As shown in FIG. 3A, again an input ciphertext 310 is received on which a function is being performed, which in this case is the "min" function that seeks to find the minimum value in the ciphertext 310. This function can be performed by performing a tournament type selection process, such as shown in FIG. 1, where the minimum between pairs of values in the pairs of ciphertext slots of the input ciphertext 310 may be determined through multiple iterations or rounds. In addition, the indicator ciphertext F 320 is initialized to the first value, e.g., "1", in each of its slots.

In this second improvement embodiment, the input ciphertext C 310 is rotated by a number of slots equal to 2 to the power of the current iteration/round of the tournament selection process, e.g., 1 in the first iteration/round, 2 in the second iteration/round, 4 in the third iteration/round, etc. Thus, in the depicted example the ciphertext C 310 has values [4, 6, 5, 7] and the rotated ciphertext, i.e., rot(C,1) rotates this ciphertext one slot to the left resulting in the values [6, 5, 7, 4]. The function that is to be performed, i.e., "min" in this example, is then performed between the input ciphertext C 310 and its rotation 330 to generate intermediate output ciphertext 340. Thus, for example, computing the min of the values of the ciphertexts 310 and 330, i.e., min between [4, 6, 5, 7] and [6, 5, 7, 4], results in the output ciphertext 340 [4, 5, 5, 4] and the intermediate indicators ciphertext 360.

The values of the first and third slots of the output ciphertext 340 that are obtained from the original input ciphertext 310 are broadcast to adjacent slots in the output ciphertext 340 to generate intermediate ciphertext 350. The first slot contains the tournament result for first and second inputs (4 and 6 in 310) and the third slot contains the tournament result for third and fourth inputs (5 and 7 in 310). This means that the first and third slots alone have the tournament results for all 4 inputs and the second and fourth slots are not needed. This broadcast operation may be performed, for example, by masking the ciphertext C 340 by using a mask (C, i) function, for example, adding a rotation operation rot(C, $2^i$) to C, where i is the index of the current iteration or round, e.g., in a first round, such as shown in FIG. 3A, i=0.

In the corresponding intermediate indicators ciphertext I 360, the negation of the values of the first and third slots are broadcast to adjacent slots. For example, this broadcasting may be done using the following steps. First, compute a new ciphertext, $I_{neg}$, which is equal to 1−I, i.e., each slot in $I_{neg}$ is equal to 1 minus the corresponding slot in I. Then, mask both I and $I_{neg}$ to zero the second and fourth slots using the mask(I, i) and mask($I_{neg}$, i) functions (e.g., i=0 in the first iteration depicted in FIG. 3A). Finally, rotate $I_{neg}$ by $2^i$ (e.g., i=0) slots to the right and add the rotation result to I, e.g., by setting I to I+rot($I_{neg}$, −$2^i$). Thus, for example, the masking causes the second and fourth slot values in the updated or intermediate indicator ciphertext I 360 being set to a second value, e.g., "0". Thus, the resultant indicator ciphertext output 370 for this iteration or round of the tournament selection process is [1, 0, 1, 0], i.e., next_F=F*I, where I is the intermediate indicator 360 and F is the previous state of the indicator ciphertext, which in this first iteration/round is F 320. This next_F is provided as the input F for the next iteration/round of the tournament selection process, such as shown in FIG. 3B.

FIG. 3B shows a second iteration/round of the tournament selection process in which the previous indicator ciphertext next_F 370 is used as an input to this second iteration/round along with the broadcast ciphertext C 350. The same process as described above with regard to FIG. 3A is performed again in this second iteration/round, but in this second iteration, the rotation operation rotates 2 slots to the left as indicated by rot(C, 2). Thus, the result of this rotation is the ciphertext 380 having values [5, 4, 4, 5]. The function is again applied, e.g., "min", resulting in the ciphertext 382 having values [4, 4, 4, 4]. The negation of the values of the first and second slots of the intermediate indicators ciphertext I 384 are broadcast to the third and fourth slots. For example, this broadcasting step may again be computed by setting $I_{neg}$ to 1−I, masking both I and $I_{neg}$ to zero the third and fourth slots using the mask(I, i) function (e.g. i=1 in the second iteration depicted in FIG. 3B) and setting I to I+rot($I_{neg}$, −$2^i$) (e.g. i=1). After this broadcasting step, I will contain the values [1, 0, 0, 1]. The resulting indicator ciphertext F 386 is determined based on the multiplication of the input indicator ciphertext F 370 and the intermediate indicator ciphertext I 384, which in this case results in output indicator ciphertext 386 having values [1, 0, 0, 0] indicating that in the original input ciphertext 310 that the minimum value is in the first slot of the input ciphertext 310, i.e., value "4". It should be appreciated that while FIGS. 3A-3B illustrate two iterations on this simplified input vector data structure for purposes of illustration, the number of iterations increases with the size of the input vector data structure, i.e., the input ciphertext 310. If the size of the input ciphertext is n, then there will be log_2(n) iterations.

Thus, in this second improved tournament process, which eliminates the need to perform the performance costly isEqual( ) function, the process for generating the output ciphertexts may include the following set of operations:

for i=0 . . . log(n)−1    1.

C,I=f(C,rot(C,$2^i$))    2.

C=mask(C,i)//mask C to zero the right half of each block of $2^{(i+1)}$ consequent slots    3.

C=C+rot(C,−$2^i$)    4.

$I_{neg}$=mask(1−I,i)    5.

I=mask(I,i)//mask I to zero the right half of each block of $2^{(i+1)}$ consequent slots    5.

I=I+(1−rot($I_{neg}$,−$2^i$))    6.

F*=I    7.

This second improvement illustrative embodiment involves 3 log(n) rotations, compared to the 2 log(n) rotations of the first improvement illustrative embodiment. Further, the multiplication depth of this second improvement illustrative embodiment is given by log(n)*(depth_of_f+2), compared to a multiplication depth of log(n)*(depth_of_f+1)+depth_of_isEqual for the first improvement illustrative embodiment. In other words, compared to the first improvement illustrative embodiment, the second improvement illustrative embodiment adds log(n) rotations and changes the multiplication depth by log(n) depth_of_isEqual. Due to the depth_of_isEqual being large and due to the function isEqual( ) being costly in terms of runtime and noise, this tradeoff is beneficial (especially for smaller values of n where log(n) is small, e.g., where n is equal to or less than 128). It should be appreciated that this tradeoff may also be dependent on the specific implementation of the isEqual function and the specific use case at hand.

It is possible to further reduce the multiplication depth of this second improvement illustrative embodiment to realize even more enhancement of performance over the first improvement illustrative embodiment. First, in some cases, steps 3 and 5 of the listing of operations above with regard to the second improvement illustrative embodiment may be combined with step 1. For example, if f( ) is an approximation of the max( ) function, then its computation may already include masking of the output ciphertexts. In such a case, the original masking of the approximated max( ) function can be combined with the masking in steps 2 and 5 to reduce the multiplication depth of the result to log(n)*(depth_of_f+1). Second, ini some cases, tradeoffs between multiplication depth of the output, C, with number of rotations may be made as illustrated in the following set of operations of a tradeoff based process:

for i=0 . . . log(n)−1    1.

C,I=f(C,rot(C,$2^i$))    2.

mask I to keep the first element of each block of $2^i$ consequent slots.    3.

duplicate the first element of each $2^i$ slots-block of I to the whole block.    4.

F*=I    5.

This tradeoff between multiplication depth and number of rotations saves the mask needed in step 3 of the second improvement illustrative embodiment, and thus, after log(n) iterations, the tradeoff based process reduces the multiplication depth of the ciphertext C by log(n). However, this improvement in performance cones at the account of increasing the number of rotations. In the $i^{th}$ iteration, step 3 of the tradeoff based process above requires $2^i$ rotations. Thus, after log(n) iterations, the tradeoff based process requires O(n) rotations, as opposed to the O(log(n)) rotations required by the first and second improvement illustrative embodiments described previously.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides fully homomorphic encryption enabled tournament type selection operations to be performed within a computing device as part of functions that can be performed using such tournament type selection operations. The improved computing tool implements mechanism and functionality which are specifically directed to improving the way in which computing devices and systems perform their operations, and specifically operations that involve a tournament type selection process. The improvements provided by the mechanisms of the illustrative embodiments cannot be practically performed by human beings either outside of, or with the assistance of, a technical environment, such as a mental process or the like. The improved computing tool provides a practical application of the methodology at least in that the improved computing tool is able to more efficiently, i.e., with lower performance cost, perform functions that involve tournament type selection processes on vector data structures, such as ciphertext data structures where multiple encrypted values are packed into a single ciphertext.

Figure 4:
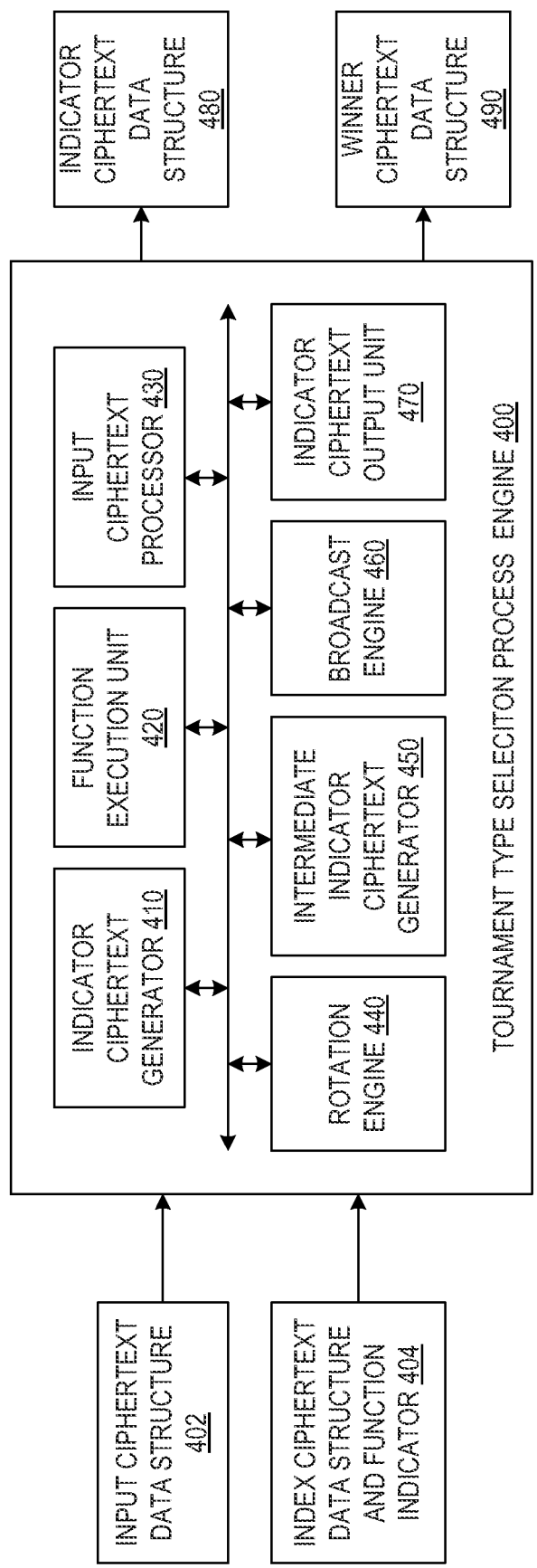
FIG. 4 is an example block diagram of the primary operational components for implementing an improved ciphertext based tournament type selection process of a computing function in accordance with one illustrative embodiment.

FIG. 4 is an example block diagram of the primary operational components for implementing an improved ciphertext based tournament type selection process of a computing function in accordance with one illustrative embodiment. As shown in FIG. 4, the primary operational elements of a tournament type selection process engine 400 comprise an indicator ciphertext generator 410, a function execution unit 420, an input ciphertext processor 430, a rotation engine 440, an intermediate indicator ciphertext generator 450, a broadcast engine 460, and an indicator ciphertext output unit 470. Each of these elements 410-470 comprise logic for performing their respective functions, where this logic may be provide provided in software executed on computer hardware, e.g., in library functions or the like, or in specialized dedicated hardware, such as logic units of a processor in a computing device, as firmware, or the like.

The indicator ciphertext generator 410 comprises the logic for initializing the indicator ciphertext F discussed above, such as at the initiation of the tournament type selection process. The input ciphertext processor 430 provides the logic for receiving the input ciphertext data structure C 402 and its corresponding index ciphertext data structure X 404. The function execution unit 420 provides the logic for performing the requested operation, i.e., the function that is being performed on the ciphertext which is accomplished by a tournament type selection process, but for the individual iterations/rounds of the tournament type selection process, e.g., if the function is a max function being executed on the ciphertext C, then the function execution unit 420 performs this max function on the pairings of values from slots of the ciphertext C, such as discussed above with regard to FIG. 1 as an example.

The rotation engine 440 provides logic for performing the rotation operations, e.g., rot(C, 1), rot(C, 2), on the input ciphertext data structure or the ciphertext generated as part of a previous iteration/round of the tournament type selection process. The intermediate indicator ciphertext generator 450 provides the logic for performing the masking operation on the indicator ciphertext F, or the updated indicator ciphertext, e.g., next_F, from a previous iteration of the tournament type selection process. The broadcast engine 460 provides the logic for performing the broadcast operation of the updated ciphertext data structure after execution of the function on the input ciphertext and the rotated ciphertext for the iteration/round (see FIGS. 3A and 3B above). The indicator ciphertext output engine 470 outputs the final indicator ciphertext data structure 480, which is a one-hot vector output 480 indicating the slot of the original input ciphertext data structure 402 that holds the result of the requested function. In addition, the engine 400 may also output the tournament winner ciphertext data structure 490 which contains the tournament winner value in all slots, e.g., see 215 in FIG. 2.

The operation of these elements 410-470 may be in accordance with one or more of the illustrative embodiments described above. While FIG. 4 shows these elements 410-470 as separate elements, it should be appreciated that two or more of these elements may be combined depending on the particular desired implementation. These elements are intended to operate automatically in response to receiving a request to perform a function on a ciphertext, where that function can be accomplished by a tournament type selection operation. For example, there may be a set of functions that are associated with tournament type selection operations and if that function is detected in an instruction pipeline, the corresponding logic of the tournament type selection process engine 400 may be invoked, passing the input ciphertext data structure 402, index ciphertext data structure 404, and an indicator of the specific function being performed so that this function may be implemented by the function execution unit 420. The resulting indicator ciphertext data structure 480 may be returned to the caller as the result of the requested operation.

Figure 5:
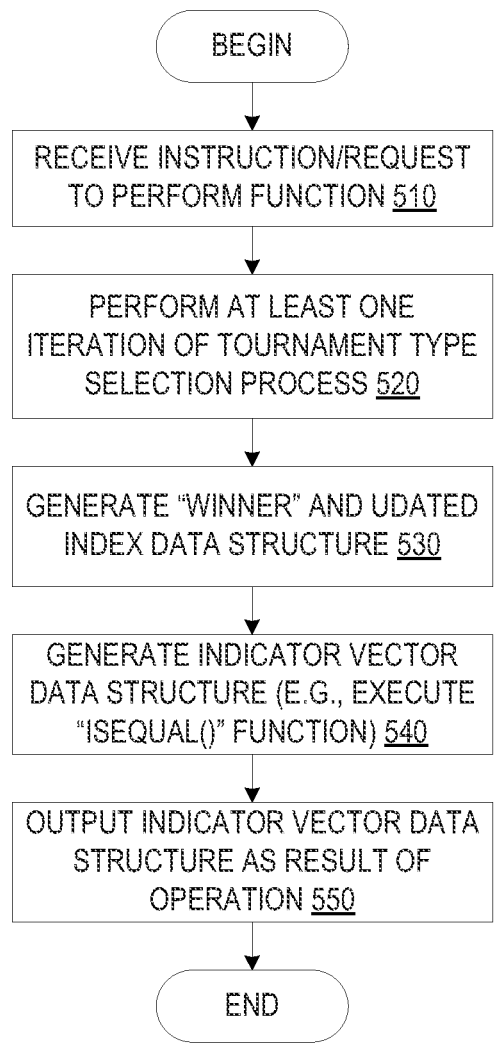
FIG. 5 is a flowchart outlining an example tournament type selection process in accordance with at least one illustrative embodiment.
Figure 6:
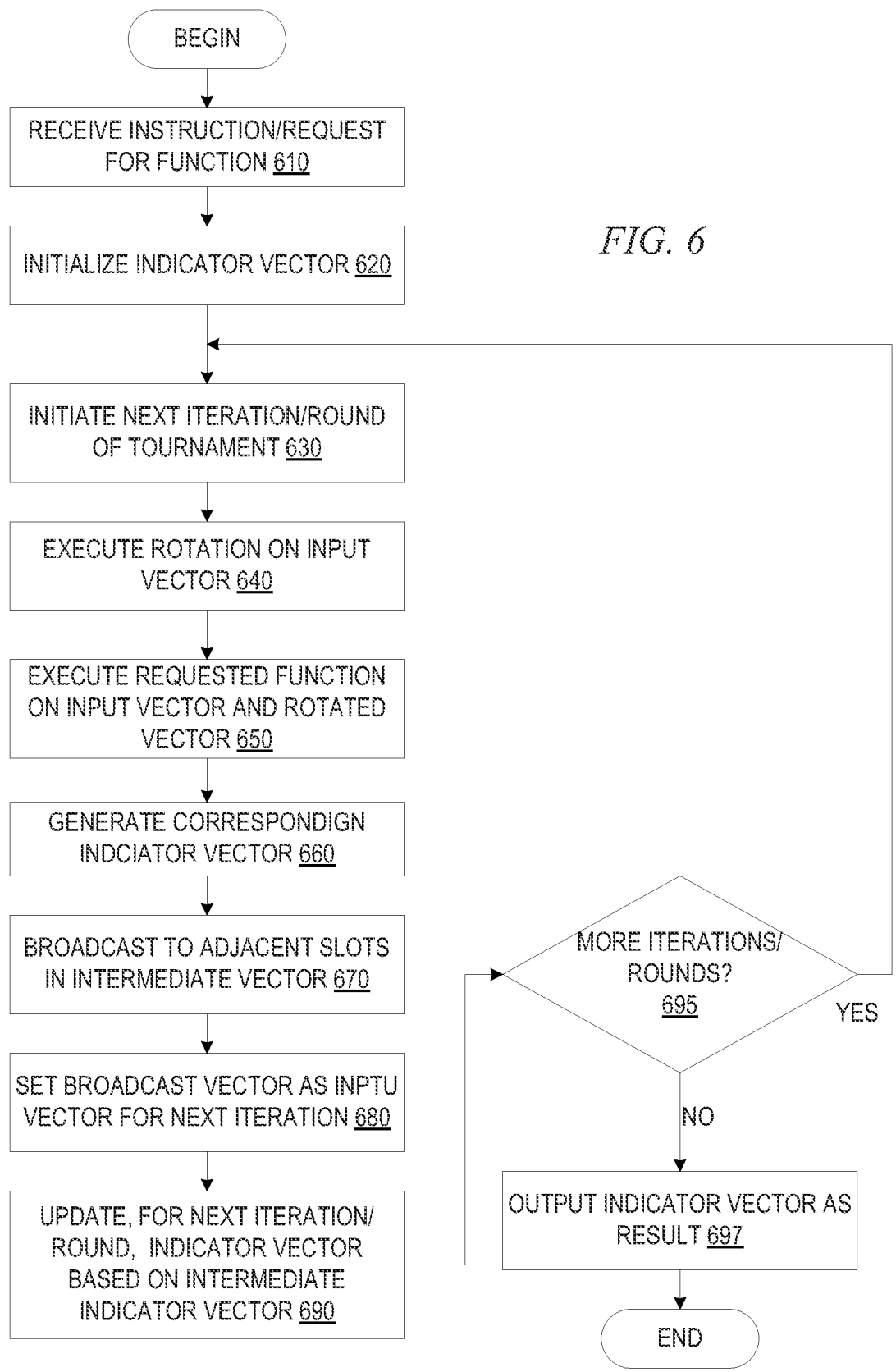
FIG. 6 is a flowchart outlining an example tournament type selection process involving iterative updating of the indicator ciphertext in accordance with one illustrative embodiment.

FIGS. 5-6 present flowcharts outlining example operations of elements of the present invention with regard to one or more illustrative embodiments. It should be appreciated that the operations outlined in FIGS. 5-6 are specifically performed automatically by an improved computer tool of the illustrative embodiments and are not intended to be, and cannot practically be, performed by human beings either as mental processes or by organizing human activity. To the contrary, the operations in FIGS. 5-6 themselves are specifically performed by the improved computing tool in an automated manner, and in particular with regard to specific computer operations or functions whose results may be generated by performing a tournament type selection operation, which is specifically improved by the mechanisms of the illustrative embodiments.

FIG. 5 is a flowchart outlining an example tournament type selection process in accordance with at least one illustrative embodiment. The operation in FIG. 5 corresponds to illustrative embodiments described above with regard to FIG. 2, for example.

The operation starts by receiving an instruction or request to perform a function on an input vector data structure, such as a ciphertext data structure C, for example (step 510). The instruction or request may specify the particular function to be performed and pass the input vector data structure, e.g., ciphertext C, and its corresponding index data structure X. At least one iteration of the tournament type selection process is executed on the vector slots of the input vector data structure (step 520) to generate a "winner" or result of the requested function and an updated index data structure (step 530). In this case, the result of the tournament type selection process may be an update to the input vector data structure in which each slot comprises the value from the input vector data structure that is determined to be the "winner" of the tournament type selection process and the index vector data structure comprises slots whose values are updated to include the index of the vector slot in the input vector data structure corresponding to the "winner" (see FIG. 2, for example). An indicator vector data structure is generated by executing an operation on the updated index vector data structure and the original index vector data structure (step 540). For example, this may involve performing an "isEqual( )" function on the updated index vector data structure and the original index vector data structure. The resulting one-hot vector data structure is output as a result of the requested computer function, where the one-hot vector data structure uniquely identifies the particular vector slot in the original input vector data structure that corresponds to the "winner" of the tournament type selection process (step 550). The operation then terminates.

FIG. 6 is a flowchart outlining an example tournament type selection process involving iterative updating of the indicator ciphertext in accordance with one illustrative embodiment. The operation outlined in FIG. 6 corresponds, for example, to illustrative embodiments described above with regard to FIGS. 3A-3B.

As shown in FIG. 6, the operation starts by receiving an instruction or request to perform a function on an input vector data structure, such as a ciphertext data structure C, for example (step 610). An indicator vector data structure is initialized to an initial state (step 620). Thereafter a next iteration/round in the tournament type selection operation is initiated (step 630). This iteration/round involves performing a rotation operation on the vector data structure in accordance with the particular iteration/round, e.g., different amounts of rotation are performed for different iterations/rounds (step 640). The requested function is the executed with regard to the vector data structure and the rotated vector data structure (step 650) to generate an intermediate vector data structure. A corresponding intermediate indicator vector data structure is generated (step 660). The values in the intermediate vector data structure are broadcast to adjacent slots in the intermediate vector data structure to generate a broadcast vector data structure (step 670). The broadcast vector data structure is used to set the input vector data structure for the next iteration/round (step 680). The intermediate indicator vector data structure is used to update the indicator vector data structure for the next iteration/round (step 690). A determination is made as to whether more iterations/rounds are to be executed (step 695). If so, the operation returns to step 630. Otherwise, the operation outputs the indicator vector data structure as a result of the requested operation (step 697) and the operation terminates.

As noted above, the illustrative embodiments are especially well suited to computing environments in which privacy of data is maintained by using ciphertext data structures. An example of such a computing environment is one in which the fully homomorphic encryption enabled operations, such as graph embedding operations, machine learning training operations, and the like, are provided as a cloud service to clients and/or when the machine learning computer models are provided as a cloud service with instances of such machine learning computer models being trained using client data at a server side and results are returned to the client. In such cases, the client data may be encrypted as ciphertext data structures which are provided to the service or remote cloud computing system which performs analytics on the ciphertext data structure or other computer operations involving operations/functions that involve a tournament type selection process to return results of those operations/functions. With the mechanisms of the illustrative embodiments, such operations/functions may be performed on the encoded and encrypted client data and thereby avoid exposure of private data, while achieving improved performance by implementing tournament type selection process mechanisms in accordance with one or more of the above illustrative embodiments.

Figure 7:
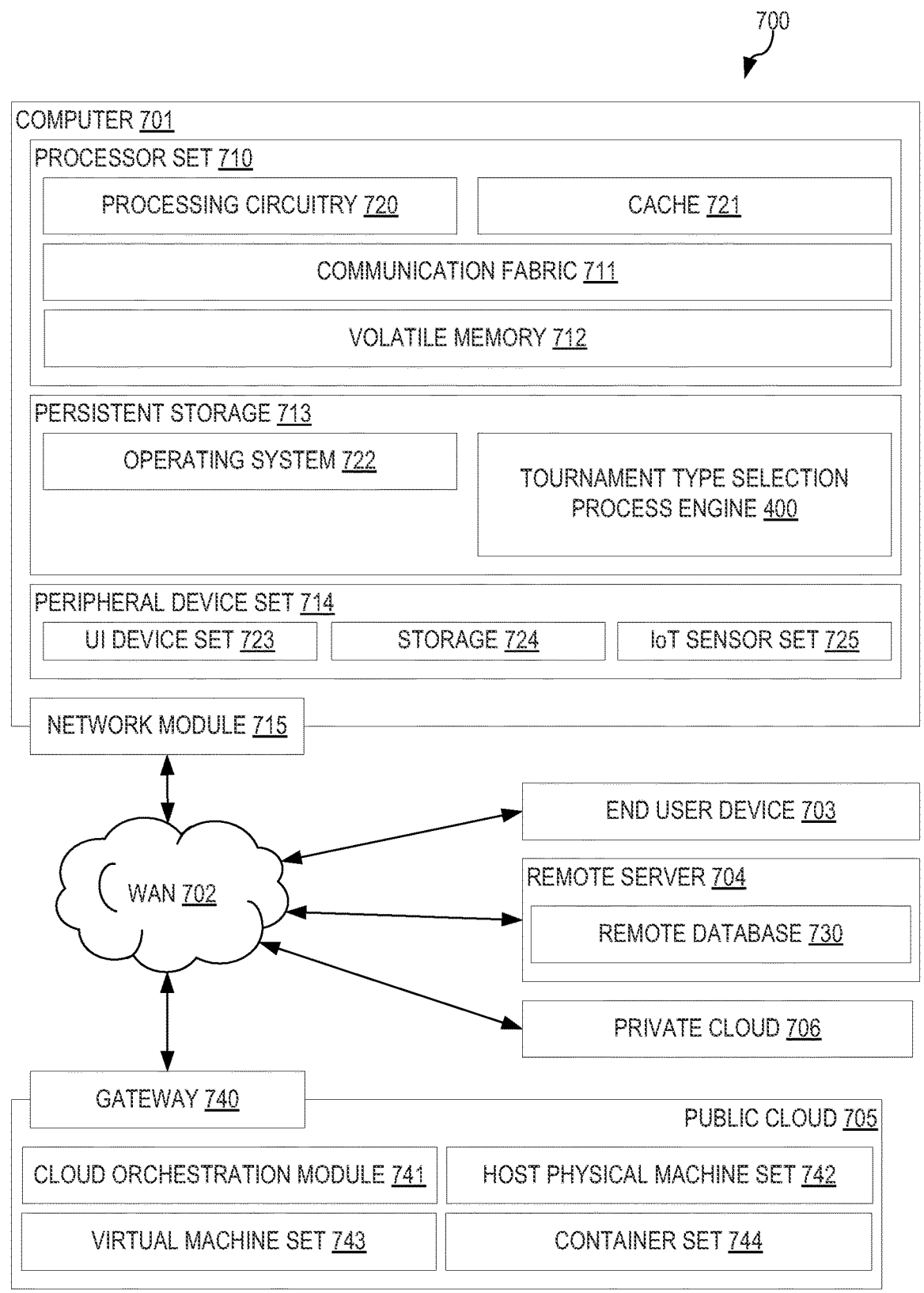
FIG. 7 is an example diagram of a distributed data processing system environment in which aspects of the illustrative embodiments may be implemented and at least some of the computer code involved in performing the inventive methods may be executed.

FIG. 7 is an example diagram of a distributed computing environment in which aspects of the illustrative embodiments may be implemented. As shown in FIG. 7, the computing environment 700 contains an example of an environment for the execution of at least some of the computer code involved in performing the inventive methods, such as the tournament type selection process engine 400 in FIG. 4. In addition to block 400, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 400, as identified above), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

Computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

Processor set 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 400 in persistent storage 713.

Communication fabric 711 is the signal conduction paths that allow the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

Persistent storage 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface type operating systems that employ a kernel. The code included in block 400 typically includes at least some of the computer code involved in performing the inventive methods.

Peripheral device set 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

Network module 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

Remote server 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

As shown in FIG. 7, one or more of the computing devices, e.g., computer 701 or remote server 704, may be specifically configured to implement a fully homomorphic encryption enabled graph embedding engine, cloud service, or the like, in accordance with one or more illustrative embodiments. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 701 or remote server 704, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein, the implementation of the mechanisms of the illustrative embodiments improves the functionality of the computing device and provides a useful and concrete result that facilitates the performance of tournament type selection processes for executing functions on vector data structures, such as ciphertext data structures or the like.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for performing a tournament selection process of a computer function, the method comprising:
   receiving a request to execute the computer function on an input vector data structure, wherein a result of the computer function is provided by executing the tournament selection process;
   receiving the input vector data structure comprising a plurality of values, each value corresponding to a vector slot of the input vector;
   receiving an index vector data structure comprising indices of the vector slots of the input vector;
   executing at least one iteration of the tournament selection process to identify a value in the input vector satisfying a criterion of the computer function; and
   performing an operation on the index vector data structure to generate an indicator vector data structure that uniquely identifies a slot in the input vector data structure that is a result of the computer function being executed on the input vector data structure, wherein executing at least one iteration of the tournament selection process to identify a value in the input vector satisfying a criterion of the computer function comprises executing a folding operation on the input vector data structure and updating the index vector data structure to generate an updated index vector data structure having an index value for a winner of the tournament selection process in each slot of the updated index vector data structure.

2. The method of claim 1, wherein the input vector data structure is a single ciphertext data structure, and wherein executing the at least one iteration of the tournament selection process comprises performing local selection operations between pairs of slots within the single ciphertext data structure based on the requested computer function.

3. The method of claim 1, wherein the computer function is one of a max function, an argmax function, a min function, an argmin function, or a candidate selection operation in which criteria for selection is specified in the computer function.

4. The method of claim 1, wherein executing at least one iteration of the tournament selection process comprises:
   executing a first iteration in which the input vector data structure is processed at least by executing a first rotation operation on the input vector data structure to generate a first rotated vector, and executing the computer function on the input vector data structure and the first rotated vector to generate a first intermediate vector result data structure;

broadcasting values of the first intermediate vector result data structure to adjacent slots within in the intermediate vector data structure to generate a first broadcast intermediate vector result data structure;

executing a first masking operation on a first indicator vector data structure to generate a first intermediate indicator vector data structure; and updating the first indicator vector data structure based on a combination of the first indicator vector data structure and the first intermediate indicator vector data structure, to thereby generate a second indicator vector data structure.

5. The method of claim 4, wherein executing at least on iteration of the tournament selection process comprises:

executing a second iteration in which the first broadcast intermediate vector result data structure is processed at least by executing a second rotation operation on the first broadcast intermediate vector result data structure to generate a second rotated vector, and executing the computer function on the first broadcast intermediate vector result data structure and the second rotated vector to generate a second intermediate vector result data structure;

executing a second masking operation on the second indicator vector data structure to generate a second intermediate indicator vector data structure; and updating the second indicator vector data structure based on a combination of the second indicator vector data structure and the second intermediate indicator vector data structure, to thereby generate a third indicator vector data structure.

6. The method of claim 5, wherein the first rotation operation has a first rotation value for rotating slots of the input vector data structure, wherein the second rotation operation has a second rotation value for rotating slots of the first broadcast intermediate vector result data structure, and wherein the first rotation value and second rotation value are different.

7. The method of claim 6, wherein the first rotation value and second rotation value are calculated as 2 to the power of the iteration.

8. The method of claim 6, wherein performing an operation on the index vector data structure to generate an indicator vector data structure comprises executing an isEqual operation on the index vector data structure and the updated index vector data structure to generate the indicator vector data structure in which the indicator vector data structure has a first value in only a slot of the indicator vector data structure corresponding to the winner of the tournament selection process and all other slots of the indicator vector data structure have a second value.

9. The method of claim 1, wherein the computer function implements a computer function in a homomorphic encrypted operation.

10. A computer program product comprising a computer readable storage medium having a computer readable program stored therein, wherein the computer readable program, when executed on a data processing system, causes the data processing system to:

receive a request to execute a computer function on an input vector data structure, wherein a result of the computer function is provided by executing a tournament selection process;

receive the input vector data structure comprising a plurality of values, each value corresponding to a vector slot of the input vector;

receive an index vector data structure comprising indices of the vector slots of the input vector;

execute at least one iteration of the tournament selection process to identify a value in the input vector satisfying a criterion of the computer function; and perform an operation on the index vector data structure to generate an indicator vector data structure that uniquely identifies a slot in the input vector data structure that is a result of the computer function being executed on the input vector data structure, wherein executing at least one iteration of the tournament selection process to identify a value in the input vector satisfying a criterion of the computer function comprises executing a folding operation on the input vector data structure and updating the index vector data structure to generate an updated index vector data structure having an index value for a winner of the tournament selection process in each slot of the updated index vector data structure.

11. The computer program product of claim 10, wherein the input vector data structure is a single ciphertext data structure, and wherein executing the at least one iteration of the tournament selection process comprises performing local selection operations between pairs of slots within the single ciphertext data structure based on the requested computer function.

12. The computer program product of claim 10, wherein the computer function is one of a max function, an argmax function, a min function, an argmin function, or a candidate selection operation in which criteria for selection is specified in the computer function.

13. The computer program product of claim 10, wherein executing at least one iteration of the tournament selection process comprises:

executing a first iteration in which the input vector data structure is processed at least by executing a first rotation operation on the input vector data structure to generate a first rotated vector, and executing the computer function on the input vector data structure and the first rotated vector to generate a first intermediate vector result data structure;

broadcasting values of the first intermediate vector result data structure to adjacent slots within in the intermediate vector data structure to generate a first broadcast intermediate vector result data structure;

executing a first masking operation on a first indicator vector data structure to generate a first intermediate indicator vector data structure; and updating the first indicator vector data structure based on a combination of the first indicator vector data structure and the first intermediate indicator vector data structure, to thereby generate a second indicator vector data structure.

14. The computer program product of claim 13, wherein executing at least on iteration of the tournament selection process comprises:

executing a second iteration in which the first broadcast intermediate vector result data structure is processed at least by executing a second rotation operation on the first broadcast intermediate vector result data structure to generate a second rotated vector, and executing the computer function on the first broadcast intermediate vector result data structure and the second rotated vector to generate a second intermediate vector result data structure;

executing a second masking operation on the second indicator vector data structure to generate a second intermediate indicator vector data structure; and updating the second indicator vector data structure based on a combination of the second indicator vector data structure and the second intermediate indicator vector data structure, to thereby generate a third indicator vector data structure.

15. The computer program product of claim 14, wherein the first rotation operation has a first rotation value for rotating slots of the input vector data structure, wherein the second rotation operation has a second rotation value for rotating slots of the first broadcast intermediate vector result data structure, and wherein the first rotation value and second rotation value are different.

16. The computer program product of claim 15, wherein the first rotation value and second rotation value are calculated as 2 to the power of the iteration.

17. The computer program product of claim 15, wherein performing an operation on the index vector data structure to generate an indicator vector data structure comprises executing an isEqual operation on the index vector data structure and the updated index vector data structure to generate the indicator vector data structure in which the indicator vector data structure has a first value in only a slot of the indicator vector data structure corresponding to the winner of the tournament selection process and all other slots of the indicator vector data structure have a second value.

18. An apparatus comprising:
at least one processor; and
at least one memory coupled to the at least one processor, wherein the at least one memory comprises instructions which, when executed by the at least one processor, cause the at least one processor to:
receive a request to execute a computer function on an input vector data structure, wherein a result of the computer function is provided by executing a tournament selection process;
receive the input vector data structure comprising a plurality of values, each value corresponding to a vector slot of the input vector;
receive an index vector data structure comprising indices of the vector slots of the input vector;
execute at least one iteration of the tournament selection process to identify a value in the input vector satisfying a criterion of the computer function; and
perform an operation on the index vector data structure to generate an indicator vector data structure that uniquely identifies a slot in the input vector data structure that is a result of the computer function being executed on the input vector data structure, wherein executing at least one iteration of the tournament selection process to identify a value in the input vector satisfying a criterion of the computer function comprises executing a folding operation on the input vector data structure and updating the index vector data structure to generate an updated index vector data structure having an index value for a winner of the tournament selection process in each slot of the updated index vector data structure.

* * * * *